July 5, 1932.  A. R. LEMIEUX  1,866,046

DOUBLE END BEARING

Filed May 28, 1931

Inventor
Archibald R. Lemieux
By attorneys

Patented July 5, 1932

1,866,046

UNITED STATES PATENT OFFICE

ARCHIBALD R. LEMIEUX, OF WORCESTER, MASSACHUSETTS

DOUBLE END BEARING

Application filed May 28, 1931. Serial No. 540,688.

This invention relates to a bearing having bearing balls at two ends thereof, each set bearing on one end of the rotatable member.

The principal objects of the invention are to provide a construction of this type in which the bronze bearing usually employed will be eliminated; to make the device rigid; to make it impossible for anybody to tamper with it in any ordinary way so as to loosen the parts; to provide means for making it dust and liquid proof, and to provide a construction which can be placed in almost any position desired.

Other objects and advantages of the invention will appear hereinafter.

Reference is to be had to the accompanying drawing, in which

This invention is applicable to a bearing adapted to be mounted in a housing 10 in a frame and carrying a shaft 11, to one end of which may be secured a pulley or other wheel 12 to which power is transmitted to it. On the other end the shaft is provided directly with a grinding wheel 13, cutter, or if desired, with another pulley for transmitting the power.

Figure 2:
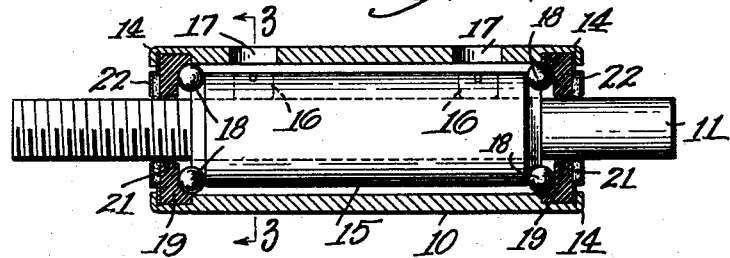
Fig. 2 is a diametrical longitudinal sectional view.
Figure 3:
Fig. 3 is a transverse sectional view on the line 3—3 of Fig. 1.
Figure 4:
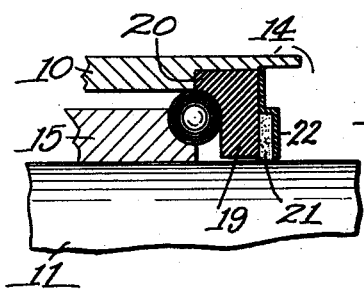
Fig. 4 is an enlarged sectional view like Fig. 2, taken at one end, showing one feature of the method of construction.

The housing 10 is mounted in a frame rigidly supported. This housing is of cylindrical form having at each end a thin cylindrical projection 14, which, before the parts are assembled, projects outwardly in a cylindrical form, as shown in Fig. 4. Inside is a sleeve 15 which may be considered as a double cone. This sleeve is fixed to the shaft by means of one or more screws 16 which are accessible through clear holes 17 in the housing to fasten the sleeve to the shaft. At the two ends of the double cone or sleeve 15 are bearing balls or other anti-friction devices 18. Each of these sets of bearing balls is held in close contact with the balls by a ball-race 19. It will be seen that the ball races 19 come up against shoulders 20 on the housing. At the outer ends of the ball races and in contact with the shaft are flat felt washers 21. These are held in place by thin steel dust caps 22, and after they are put in place the cylindrical ends 14 are bent over into contact with them, as shown in Fig. 2.

This furnishes a complete protection against the entrance of dust and moisture, because these bent ends 14 come into contact with the steel dust cap and this dust cap is provided with a cylindrical projection flat on the edge just fitting around the felt washer 21 and pressing that against the ball race. The felt washer, of course, bears on the shaft and excludes dust and moisture, and it is held by the dust cap in such a way that these elements cannot work in behind it.

Figure 1:
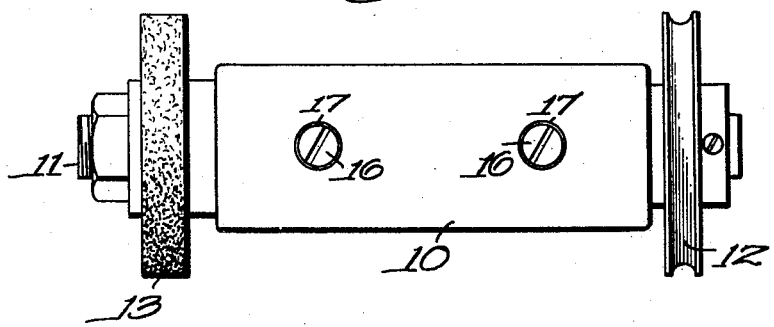
Fig. 1 is a plan of a bearing constructed in accordance with this invention, showing one way in which it can be connected up with the power and an element to be operated.

By having the balls bear on both ends of the sleeve or double cone 15 and all these parts held rigidly by the annular ends of the parts 14, when bent into a complete form, a rigid construction is secured. Furthermore, there is no way for anybody to get inside it except by going to the trouble of bending back the flat flange at the end of the part 14, and accidents are not likely to happen to it for that reason. The usual bronze bearings are entirely eliminated and the device can be used as indicated in Fig. 1, or for any other purpose where a bearing of this kind is desired for transmitting power to a shaft passing through it.

Although I have illustrated and described only one form of the invention, I am aware of the fact that modifications can be made therein by any person skilled in the art without departing from the scope of the invention as expressed in the claims. Therefore, I do not wish to be limited to the exact form shown, but what I do claim is:—

1. In a bearing of the class described, the combination with a shaft extending through the bearing, a sleeve secured to the shaft and having bearing surfaces on its opposite ends, said sleeve extending throughout the length of the bearing in a single piece, bearing balls located in contact with the said bearing surfaces, ball races outside the bearing balls on both ends, flanges bent inwardly from the housing to hold the races permanently in a definite position so as to keep the whole bearing rigid, a pair of flat washers pressing against the shaft and located against the outside surfaces of the two ball races, and dust caps each having a central recess for receiving said washers and a flat circular edge extending under the turned-over portion of the housing, said turned-over flat portion engaging said flat circular portion and holding the parts in rigid condition.

2. In a bearing of the class described, the combination with a shaft extending through the bearing, a sleeve secured to the shaft and having end bearing surfaces on its opposite ends, said sleeve extending throughout the length of the bearing in a single piece, bearing balls located in contact with the said bearing surfaces, ball races outside the bearing balls, a pair of flat washers pressing against the shaft and located directly in contact with the outside surfaces of the two ball races, and dust caps each having a central recess for receiving said washers and a flat circular edge held in position by the housing.

In testimony whereof I have hereunto affixed my signature.

ARCHIBALD R. LEMIEUX.